United States Patent [11] 3,630,412

| [72] | Inventors | Erwin L. Capener<br>San Jose, Calif.;<br>Lionel A. Dickinson, Accokeek, Md. |
|---|---|---|
| [21] | Appl. No. | 26,645 |
| [22] | Filed | Apr. 8, 1970 |
| [45] | Patented | Dec. 28, 1971 |
| [73] | Assignee | Stanford Research Institute, Menlo Park, Calif. |

[54] METHOD AND APPARATUS FOR GENERATING AEROSOLS
5 Claims, 4 Drawing Figs.

[52] U.S. Cl. .................................................... 222/1,
222/4, 222/193, 239/1
[51] Int. Cl. ....................................................... B67b 7/00
[50] Field of Search ............................................ 239/1;
222/4, 193, 1

[56] References Cited
UNITED STATES PATENTS

| 1,232,510 | 7/1917 | Derrick et al. ................. | 222/193 |
|---|---|---|---|
| 3,478,926 | 11/1969 | Pfeiffer et al. ................. | 222/1 |

*Primary Examiner*—Samuel F. Coleman
*Attorneys*—Donovan J. De Witt and Gregg, Hendricson and Caplan

ABSTRACT: An aerosol is generated in the atmosphere by the use of a rocket wherein the internal pressure generated by combustion of a propellant is employed to force an aerosol-forming material carried within the rocket into contact with the stream of gases exiting from the rocket at velocities of at least Mach 1. The aerosol-forming material is injected through orifices into the said gas stream at pressures which are well above those prevailing in said stream at the injection point, thereby providing a high-pressure drop across the injector orifices.

Patented Dec. 28, 1971 3,630,412
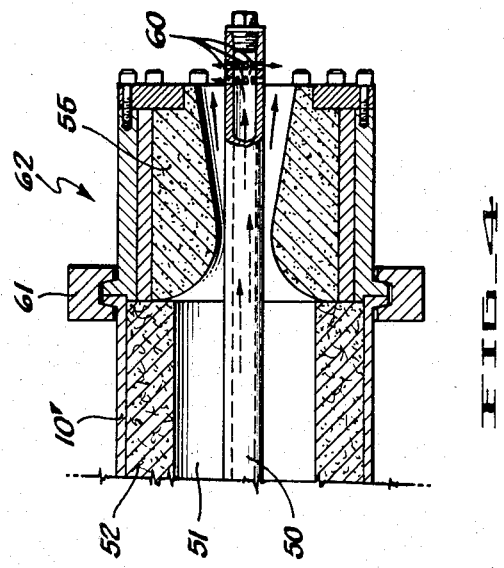
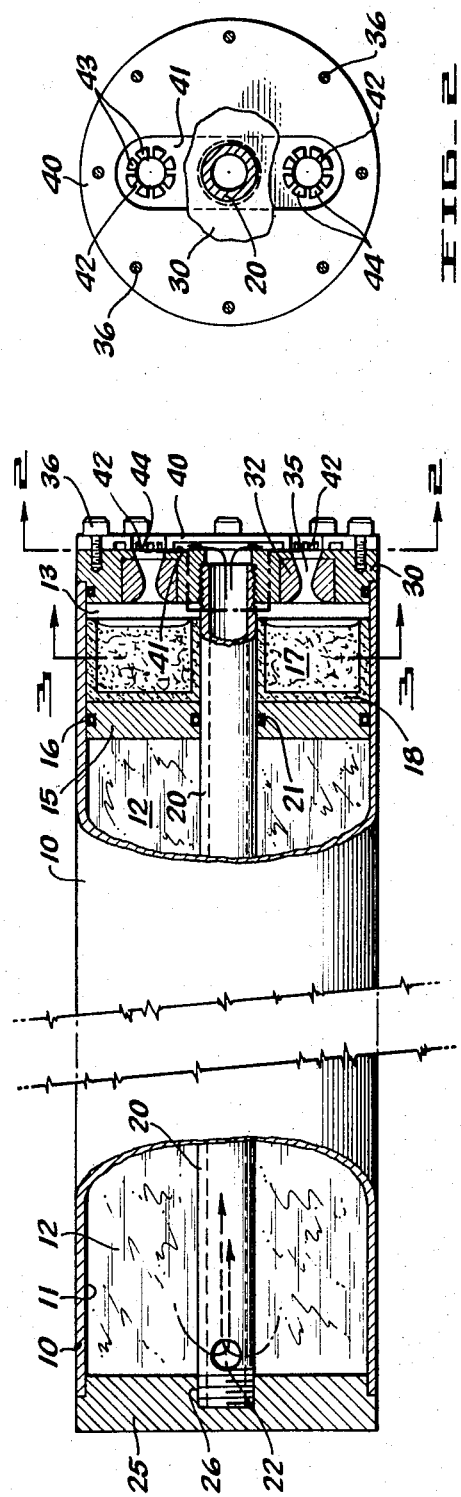
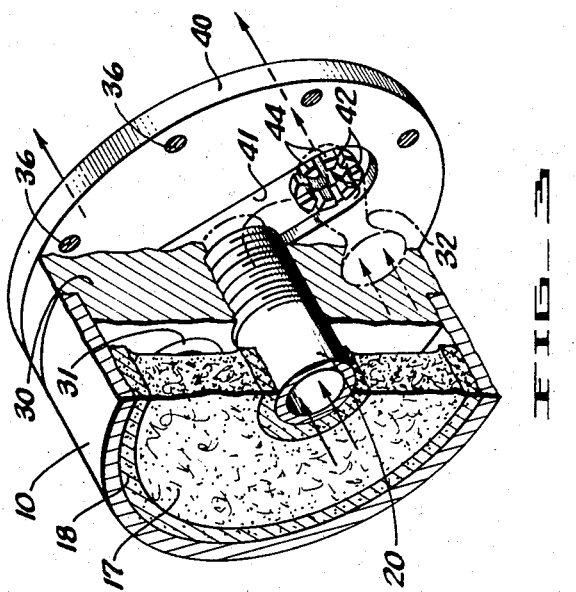
ERWIN L. CAPENER &
LIONEL A. DICKINSON
INVENTORS
BY Donovan J. DeWitt
ATTORNEY

METHOD AND APPARATUS FOR GENERATING AEROSOLS

BACKGROUND OF THE INVENTION

U.S. Pat. No. 2,993,648, issued July 25, 1961 to Blackwell, teaches the employment of internal pressures generated within a rocket by combustion of the propellant to express the spray reagent carried therein directly out of its chamber and into the atmosphere. The resulting spray particles which are formed in the atmosphere by the apparatus are relatively large and uneven in size. No aerosol is formed by the method or apparatus of this patent.

It is an object of this invention to provide means whereby the spray reagent or any other pumpable material carried by the rocket can be discharged therefrom in the form of an aerosol of predetermined particle size. Another object is to provide means which permit of the extremely rapid conversion of large quantities of liquid, gel or slurry into aerosol form.

SUMMARY OF THE INVENTION

This invention relates to a method and apparatus for generating aerosols in the atmosphere. The method is one wherein a pumpable body of the aerosol-forming material, which may be in liquid, slurry or gel form, for example, is rapidly forced through orifices into a flowing stream of gases having a velocity of at least Mach 1 and usually a velocity from about Mach 2 to 3.0. The pressure in the gas stream at the point of injecting the aerosol-forming material is substantially lower than that which is applied to said material to force the same through the orifices. Usually this gas stream pressure is essentially atmospheric (15 p.s.i.a.), while that applied to the aerosol-forming material ranges from about 50 to 3,000 p.s.i.a. There is thus a substantial pressure drop across the orifices, with the result that a high velocity is imparted to the injected material. This aids in its breaking into very small aerosol particles.

The apparatus of the invention may comprise a rocket having a forward reservoir in which to contain the aerosol-forming material, and an aft combustion chamber, provided with an ignitable propellant, which is in communication with a trailing reaction nozzle from which combustion gases are discharged at velocities of at least Mach 1. Provision is made either by the use of suitable piston or other appropriate means to utilize the internal gas pressures generated by the combustion process to express the contained aerosol-forming material through a suitable conduit and out into the discharged stream of combustion gases through orifices provided adjacent the exit of the said gases from the nozzle.

The present invention is adapted to convert a wide variety of materials into aerosol form. The only requirement is that the material be one which is pumpable and thus will flow under pressure from its place of deposit in the rocket to the orifices and through the same for discharge into the exiting combustion gas stream. These internally generated pressures can be adjustably regulated over a wide range of from about 50 to 3,000 p.s.i.g. or more. This permits one to employ not only conventional liquids, but also gels as well as slurries containing as much as 80 percent or more of solids, and such other materials as will become pumpable, i.e., flowable under pressure, at the conditions of high pressure employed. In general, the useful aerosol-forming material are those with a viscosity of about 1 to $10^6$ centipoises. The aerosol-forming materials which can be used in a practice of this invention include agricultural treating agents such as fungicides, insecticides, fertilizers, herbicides and defoliants. There may also be used liquids such as the various glycols and polycols, optionally with dyes, which leave a well visible aerosol trail. For fog dispersal uses, the material may be a slurry of finely divided, solid carbon dioxide particles in a suitable liquid vehicle. For fire extinguishing purposes such as those wherein the device of the present invention is anchored against movement in the wing tank of an airplane, the aerosol-forming charge can be any of the formulations now used for this purpose.

Whatever the nature of the aerosol-forming material, the pressures employed to carry the same to and through the exit orifices should be such as to provide a relatively high pressure drop across the orifice and thus impart a high velocity to the injected material as it leaves the orifice for passage into the rocket combustion gas stream. This pressure drop should be of the order of at least about 35 p.s.i. and can be several thousand pounds per square inch, or more. The velocity imparted to the material leaving the orifices to enter the gas stream is typically from about 200 to 1,000 feet per second.

The aerosols generated by a practice of this invention range in particle size from about 0.1 micron up to 1,000 microns or larger. This particle size, which is usually expressed in terms of its 50 percent point, is dependent upon a number of variables. One important factor is the ratio of the weight of the aerosol-forming material injected into the exhaust gases to that of the burned propellant. Thus, aerosols containing smaller particles, e.g., those of 0.3 to 10 micron size, tend to be formed when this weight ratio is less than about 2.5 to 1. Larger particle sizes may be formed at ratios above this level. Other variables influencing particle size include the relative velocities between the injected fluid particles and the exhaust gas stream, the viscosity of the injected fluid and the location of the injector orifices with respect to the gas exit nozzles. In this connection, two injection locations prove to be approximately of equal effectiveness in aerosol formation. In one, the fluid is injected radially inwardly at the outer edges of the exhaust gas stream just as it is leaving the nozzle. In the other structure the injector is incorporated in a central tube within the nozzle whereby the aerosol-forming material is injected radially outwardly into the flowing gas stream, as the stream is leaving the nozzle. The shape of the injector holes was either round or square. These designs are those which form the subject of the drawings, as discussed below.

The solid propellant materials which can be employed in a practice of this invention include any of those known in the art which are self-combustible, slow burning, nonexplosive, and generate large volumes of gases. Representative solid propellants useful in this invention include those of the double base type, such as ballistite type, a solid nitroglycerin-nitrocellulose double base propellant. Another example of a double base propellant is cordite, which consists of nitroglycerin, nitrocellulose and carbamite (diethyl diphenyl urea). Other useful propellants include those of the composite type comprising a major amount of a solid inorganic oxidizing salt and a minor amount of an organic binder which serves as the fuel for the oxidizer. Such inorganic oxidizing salts include the ammonium, alkali metal, and alkaline earth metal salts of nitric, chloric, and perchloric acids, such as ammonium perchlorate, potassium perchlorate, ammonium nitrate, lithium perchlorate, potassium nitrate, and the like. Suitable binder materials which can be used in fabricating those composite propellants include natural and synthetic rubbers, asphalt, cellulose and derivatives thereof, and polymers of acrylic, epoxy, phenolic, and the like materials, polyamides, polyesters, polyethylene polysulfides, polyurethanes, and the like. An example of a known composite solid propellant is Galcit, which consists of finely divided potassium perchlorate in asphalt and oil. These propellants can be cast, compression molded, or extruded into the desired shape or geometry. After shaping the propellant, it can then be cured so as to set up into a relatively rigid mass which can be machined or otherwise finished to the desired shape.

The liquid propellants which can be employed in this invention include liquid monopropellants such as nitromethane, diethylene glycol dinitrate, ethylene diamine, bexanitroethane, and the like, and liquid bipropellants such as red fuming nitric acid and aniline, liquid oxygen and methanol hydrogen peroxide and kerosene. These liquid propellants can be fed under pressure from tanks to the combustion chamber where they are burned, the combustion gases being utilized to provide thrust and pressure for ejecting the aerosol-forming treating agent.

The present device is characterized by an extremely rapid action time. Thus, the load of aerosol-forming material carried in the rocket may be completely converted into aerosol form in periods which can be as short as 0.1 second or as long as 100 seconds or more, depending on the particular rocket design employed. This is of importance in using aerosol clouds for suppressing incipient fires or explosions, or in the dissemination of riot control agents or smokes. Action time may be varied by adjusting the motor operating time from several hundred milliseconds, or less, to a 100 seconds, or more. With solid propellant rocket motors this is accomplished by appropriate grain design, operating pressure and propellant composition. With liquid propellants the operating pressure, propellant composition or propellant flow rates are adjusted to give the appropriate burning time.

In addition to the uses enumerated above, the structure of the present invention is well adapted to be employed for agricultural field spraying. In this usage the rocket can be slung from and directed along a wire which is strung at the appropriate height along the field. The rocket can be stopped by any one of a variety of methods, including that wherein the rocket is halted as it hits a target such as a plastic bag filled with water. The rocket can be recovered and reloaded for return over another sector of the field. In another application, the present invention can be utilized to dispel fog over airport runways. Here the rocket can be fired down the runway to expel an aerosol made up of fine particles of a slurry of solid carbon dioxide as contained in a suitable liquid vehicle. In still another application, the rocket can be incorporated into a hand fired device to be used by aviators or other personnel who may be come lost. Firing the rocket into the sky will leave a long trail of aerosol which will clearly delineate the position on the earth's surface of the person firing the rocket. In military applications, the device hereof can be anchored to a tank or other vehicle and, when suitably actuated, can surround the vehicle and the adjacent areas with a visually impenetratable fog in a matter of a few milliseconds. Glycols such as diethylene glycol are well adapted for this military usage.

Other objects, advantages and features of this invention will become apparent from the following detailed description and the accompanying drawing in which:

FIG. 1 is an elevational view, partially in section, illustrating the invention in an embodiment wherein a rocket is provided with means of exiting combustion gases;

FIG. 2 is a sectional view taken along the plane 2—2 of FIG. 1;

FIG. 3 is an isometric view, to an enlarged scale, taken along the plane 3—3 of FIG. 1; and FIG. 4 is a sectional view illustrating the invention in another embodiment thereof wherein a rocket is provided with means for injecting the aerosol-forming material radially outwardly into the surrounding stream of exiting combustion gases.

Referring more particularly to the embodiment of the invention shown in FIGS. 1–3 of the drawing, there is illustrated a rocket having a tubular outer casing 10 which serves in part to define a liquid-tight compartment 11 adapted to contain a pumpable aerosol-forming material 12, and a propulsion reaction chamber 13. These two compartments are divided by a movable annular piston 15, the outer periphery of which is provided with a ring 16 which is in sealing engagement with the casing 10 and is slidably movable along the same. An annular body of a propellant fuel 17, contained within an insulating package 18, is secured to the rearward face of the said piston.

A hollow tubular conduit 20 extends axially of the rocket and through piston 15 which carries an inner sealing ring 21 which is slidably movable along the outer wall of said conduit. The latter member is externally threaded at its respective forward and aft ends and is provided adjacent its forward end with ports 22 which serve to receive the aerosol-forming material 12 as piston 15 is forced in a forward direction by pressure generated within chamber 13 by combustion of propellant 17.

At its forward end, the rocket is provided with a closure plate 25 having a threaded recess 26 adapted to be screwed about the forward end of conduit 20 as said plate is seated into place against casing 10. The aft end of the rocket is provided with a closure plate 30 having a central bore which extends therethrough and is threaded so as to engage about the aft threaded end of conduit 20 as plate 39 seats into place against casing 10. Plate 30 is provided with a pair of inset, gas-exit nozzles 31 and 32, normally fabricated of graphite, which are of the De Laval type and have an axial converging-diverging passage 35 which communicates at the inlet end with combustion chamber 13.

Secured in place against the rearward, or outer face of plate 30 by means of screws 36 is an injection orifice plate 40 which is relieved at 41 to provide a passageway through which aerosol-forming material discharged from the aft end of conduit 20 may travel for exit through orifices 42 cut into the walls of upstanding circular bosses 43 and 44. The top margins of the said bosses are level with the surface of plate 40 and bear against the adjacent face of plate 30 about the periphery of the exit from each of the nozzles 31 and 32.

In operation using the device of FIGS. 1–3, the rocket, loaded with aerosol-forming material in chamber 11 and with an ignitable propellant 17 in combustion chamber 13, is ignited by conventional means (not shown). This induces the flow of combustion gases through nozzles 31 and 32 and generates pressure within the combustion chamber. Under the influence of said pressure, piston 15 travels forwardly and exerts sufficient pressure against the aerosol-forming material in chamber 11 as to force the same into the conduit 20 through ports 22. This material then flows from the conduit through plate 30 and then through the relieved portion 41 in plate 40 for exit into the discharged combustion gas streams through the orifices 42 in each of the circular bosses 43 and 44. The passage of the material leaving conduit 20 for radial discharge inwardly into the exiting gas streams is indicated by the arrows employed in FIGS. 1 and 3.

In the embodiment of the invention shown in FIG. 4, the piston and the forward chamber for containing the aerosol-forming material are omitted, they being essentially the same as those shown in FIG. 1. Here a conduit 50, which receives the material from the forward chamber as the piston advances, is shown as leading through a combustion chamber 51 provided with a propellant 52. A gas exit nozzle 55 of the De Laval type is aligned with the combustion chamber, and conduit 50 passes through the center of this nozzle where it is surrounded by the exiting combustion gases. The aerosol-forming material passing through the conduit is discharged radially outward into the adjacent gas stream through orifices 60 in the conduit, as shown by the arrows of the figure. In this embodiment, the nozzle 55 is secured to the aft end of the rocket casing 10 by a conventional mounting ring 61 and the associated structure as generally indicated at 62.

The following examples illustrate the practice of the invention in various of its embodiments.

EXAMPLE 1

A rocket 40 inches long and 5 inches in diameter, of the general type illustrated in FIG. 4 of the drawing, is loaded with 5 pounds of propellant and 23 pounds of ethylene glycol, the aerosol-forming material, the weight ratio of the latter to fuel thus being 4.6 to 1. The aerosol-forming material is discharged radially outwardly into the exhaust stream of the rocket through an injector having 20 circular orifices, each having a diameter of 0.1 inch. The following data characterize the run as the rocket is fixed to a stand and fired vertically upward.

| | |
|---|---|
| Action time | 1.3 seconds |
| Chamber pressure | 900 p.s.i.g. |
| Injector pressure | 900 p.s.i.g. (approx.) |
| Pressure drop across injector | 900 p.s.i.g. (approx.) |
| Exhaust gas velocity at injection | Mach 3 point of ethylene glycol |
| Velocity of injected | 330 ft./sec. | ethylene glycol

Analysis of the resulting aerosol shows the same to have a bimodal composition, with approximately 10–15 percent of the particles having a diameter of 500–1,000 microns, with the balance having a 50 percent point of approximately 3 microns.

EXAMPLE 2

The run of example 1 is repeated, but using 12.5 pounds of ethylene glycol rather than 23 pounds, and with an injector having only 10 rather than 20 orifices, each of 0.1 inch diameter. Other conditions remain the same. In this run, wherein the weight ratio of aerosol-forming material to fuel is 2.5 to 1, it is found that the resulting aerosol has particles of a generally uniform size, the 50 percent point thereof being 2 microns.

We claim:

1. A method of converting a pumpable material into an aerosol, which comprises causing the aerosol-forming material to flow under pressure through an orifice into a hot stream of gases having velocity of at least Mach 1 and a pressure which is at least 35 p.s.i. lower than that applied to said aerosol-forming material at the orifice.

2. A method of providing an aerosol in the atmosphere, which comprises:
   igniting a propellant in a gas generator containing a propellant and a pumpable aerosol-forming material,
   discharging combustion gases from said generator to the atmosphere in the form of an effluent gas stream having a velocity of at least Mach 1, and
   utilizing the pressure established within the generator by combustion of the propellant to exert pressure on the aerosol-forming material and thereby cause the same to flow through orifice means for discharge into said effluent gas stream, there being a substantial pressure drop across said orifice means.

3. A method as recited in claim 2 wherein the pressure of the effluent gas stream at the point of introducing the aerosol-forming material is substantially 15 p.s.i.a. and that applied to the said material is at least 50 p.s.i.a.

4. A jet-propelled device for generating an aerosol in the atmosphere comprising,
   a casing,
   means dividing said casing into a rearward propulsion reaction chamber and a forward reservoir,
   a pumpable aerosol-forming material loaded within said reservoir and a self-combustible, gas-generating propellant charge loaded within said reaction chamber,
   a reaction nozzle secured to the gas discharge end of the casing and communicating with the reaction chamber, said nozzle being adapted to exhaust combustion gases at a velocity of at least Mach 1,
   a conduit communicating with said reservoir and with discharge orifice means positioned adjacent the gas exit end of the nozzle for communication with the combustion gases discharged therethrough, and
   means adapted to permit combustion gases generated by said propellant within the reaction chamber to exert pressure upon the aerosol-forming material in said forward reservoir and cause the same to flow through said conduit and out the discharge orifice means for contact with discharged combustion gases having a velocity of at least Mach 1.

5. A device as recited in claim 4 wherein said last-named means comprises a piston adapted to move forward into said reservoir as a result of pressure exerted thereon by said combustion gases.

* * * * *